United States Patent [19]

Itou et al.

[11] Patent Number: 5,453,910
[45] Date of Patent: Sep. 26, 1995

[54] GAS INSULATED SWITCHGEAR DEVICE

[75] Inventors: Syunji Itou; Hitoshi Kayaba; Masahiro Takahoshi, all of Hitachi; Hiroshi Suzuyama, Hitachioota; Minoru Sakaguchi, Hitachi, all of Japan

[73] Assignee: Hitachi, Ltd., Tokyo, Japan

[21] Appl. No.: 98,047

[22] Filed: Jul. 28, 1993

[30] Foreign Application Priority Data

Aug. 7, 1992 [JP] Japan .................................. 4-211579

[51] Int. Cl.$^6$ ........................................................ H02B 5/06
[52] U.S. Cl. ........................... 361/612; 361/604; 361/618
[58] Field of Search ............................. 200/148 R, 148 B, 200/148 D, 148 F, 48 R–48 CB; 361/600–621

[56] References Cited

U.S. PATENT DOCUMENTS

| | | | |
|---|---|---|---|
| 4,503,481 | 3/1985 | Fujiya et al. | 361/612 |
| 4,829,400 | 5/1989 | Enotomo | 361/618 |
| 4,862,319 | 8/1989 | Suzuyama et al. | 361/612 |
| 4,967,307 | 10/1990 | Itou et al. | 361/618 |
| 5,001,599 | 3/1991 | Itou et al. | 361/604 |
| 5,045,968 | 9/1991 | Suzuyama et al. | 361/618 |
| 5,134,542 | 7/1992 | Suzuyama et al. | 361/612 |

FOREIGN PATENT DOCUMENTS

| | | |
|---|---|---|
| 190551 | 3/1986 | European Pat. Off. |
| 57-193911 | 11/1982 | Japan . |
| 61-161909 | 7/1986 | Japan . |
| 63-164309 | 10/1988 | Japan . |

*Primary Examiner*—J. R. Scott
*Attorney, Agent, or Firm*—Fay, Sharpe, Beall, Fagan, Minnich & McKee

[57] ABSTRACT

A gas insulated switchgear device includes a pair of main bus lines arranged in parallel; a pair of auxiliary bus lines arranged in parallel; three sets of circuit breakers each including at both ends thereof respective disconnecting switches, the three sets of circuit breakers being electrically connected in series between the pair of main bus lines via the pair of auxiliary bus lines; and a cable head provided at junction points between the disconnecting switches belonging to the respective adjacent circuit breakers. The pair of main bus lines and the pair of auxiliary bus lines are arranged in parallel with each other over a substantially horizontal plane near their installation plane, and the three sets of circuit breakers are vertical type circuit breakers and are disposed at one side of the pair of main bus lines and of the pair of auxiliary bus lines along their axial direction.

8 Claims, 4 Drawing Sheets

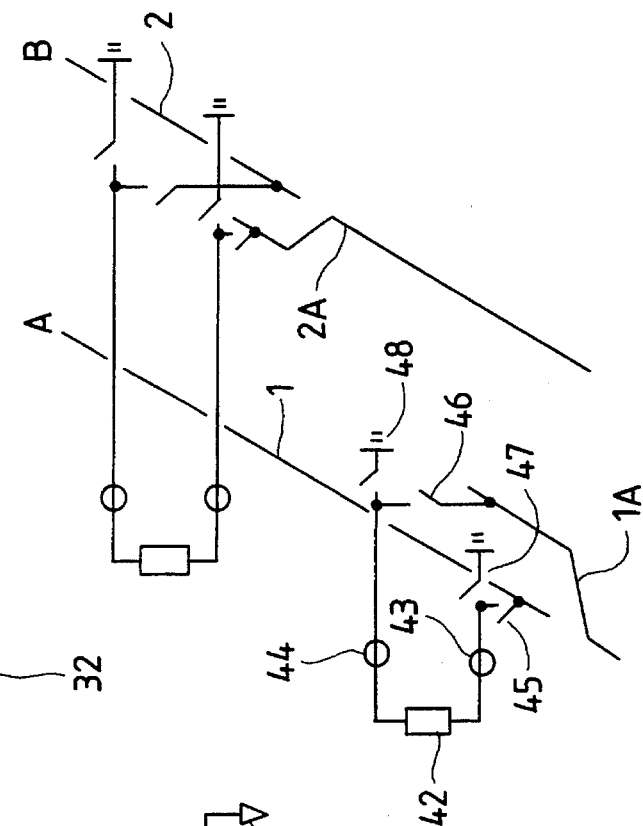
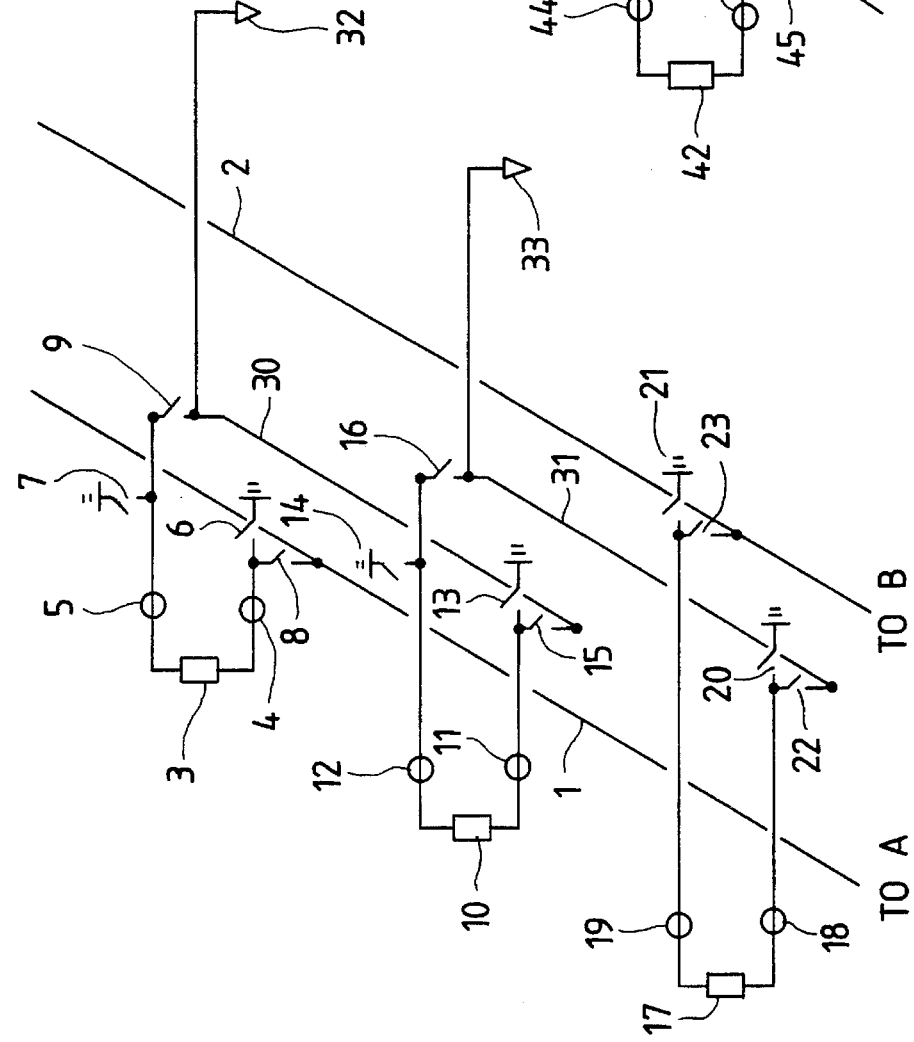

GAS INSULATED SWITCHGEAR DEVICE

BACKGROUND OF THE INVENTION

1. Field of the Invention

The present invention relates to a gas insulated switchgear device and, in particular, relates to a gas insulated switchgear device wherein three sets of circuit breakers are connected in series between a pair of main bus lines.

2. Description of Related Art

In a gas insulated switchgear device, respective constitutional elements such as main bus lines, branch bus lines and circuit breakers are disposed in closed containers filled with an insulating gas such as $SF_6$ gas and are electrically connected depending upon required circuit structures. As one of such circuit structures, a one and one-half circuit breaker system is known wherein three sets of circuit breakers are connected in series between a pair of main bus lines and electric power is received and supplied through junction points between adjacent circuit breakers. Since the circuit structure of the one and one-half circuit breaker system enjoys great freedom and a high flexibility with regard to its system operation, it is unnecessary to interrupt operation of, for example, power transformers and power distribution lines when inspecting circuit breakers to thereby greatly limit an area of power service interruption.

Japanese Patent Application Laid-Open No. 61-161909; which corresponds to European Patent Publication Number 0190551, discloses a conventional gas insulated switchgear device based on the above circuit structure. A pair of main bus lines are disposed in parallel with a predetermined spacing distance, and three lateral type circuit breakers are disposed in parallel between the pair of main bus lines so as to be located on respective lines connecting the pair of main bus lines. Because of the parallel disposition of the three lateral type circuit breakers between the pair of main bus lines, the spacing distance between the pair of main bus lines has to be enlarged, which thereby increases the total installation plane of the gas insulated switchgear device.

Japanese Utility Model Application Laid-Open No. 63-164309 discloses an improved gas insulated switchgear device constituted based upon the above circuit structure for reducing a total installation plane therefor. A pair of main bus lines are disposed closely and in parallel, and three vertical type circuit breakers are disposed in parallel along one outer side of the pair of facing main bus lines. Auxiliary bus lines, which connect the adjacent vertical type circuit breakers and insulated leading-out means through which electric power is received and supplied are disposed at one side of the parallel vertical type circuit breakers remote from the pair of main bus lines.

Further, Japanese Utility Model Laid-Open No. 57-193311, which corresponds to U. S. Pat. No. 4,503,481, discloses another improved gas insulated switchgear device based upon the above circuit structure. A pair of main bus lines are disposed closely and in parallel, and three sets of vertical type circuit breakers are disposed in parallel along one outer side of the pair of facing main bus lines. Further, auxiliary bus lines, which connect the adjacent vertical type circuit breakers and insulated leading-out means through which electrical power is received and supplied, are disposed along the other outer side of the pair of facing main bus lines.

The the gas insulated switchgear device disclosed in Japanese Utility Model Laid-Open No. 63-164309 reduces its installation plane because the pair of main bus lines are disposed close to each other. However, since the pair of main bus lines are disposed along one side of the parallel disposed vertical type circuit breakers, and since the auxiliary bus lines and the insulated leading-out means through which electrical power is received and supplied are disposed along the other side of the parallel vertical type circuit breakers, it has been difficult to access the circuit breakers for inspection and maintenance. Thus, inspection and maintenance work is very time consuming.

Moreover, since the pair of main bus lines, the auxiliary bus lines and the insulated leading-out means disclosed in Japanese Patent Application Laid-Open No. 57-193911 are collectively arranged on one side of the circuit breakers, a space for inspection and maintenance work was formed along the other side of the circuit breakers. The structure however, necessitates that the heavy auxiliary bus lines be arranged over the main bus lines, which reduces the earthquake resistance of the gas insulated switchgear device and makes the structure of the gas insulated switchgear devices complex due to the necessity of additional supporting members for the auxiliary bus lines.

SUMMARY OF THE INVENTION

An object of the present invention is to provide a gas insulated switchgear device which shows excellent earthquake resistance and faciliates the inspection and maintenance of circuit breakers contained therein.

For achieving the above objects, a gas insulated circuit breaker according to the present invention includes a pair of main bus lines, three sets of circuit breakers each having disconnecting switches at both ends thereof connected in series via auxiliary bus lines between the pair of main bus lines, and insulated leading-out means through which electrical power is received and supplied. The insulated leading-out means are provide at; junction points between the disconnecting switches belonging to respective adjacent circuit breakers. The pair of main bus lines and the auxiliary bus lines are arranged in parallel substantially over the same horizontal plane near the installation plane, and the three circuit breakers are vertical type circuit breakers arranged respectively along one outer side of the main bus lines and the auxiliary bus lines in the axial direction of the respective bus lines.

In the gas insulated switchgear device according to the present invention, since the main bus lines and the auxiliary bus lines are collectively disposed at one side of the circuit breakers, a sufficient space for inspection and maintenance work is left at the other side of the circuit breakers. Further, since the heavy main bus lines and auxiliary bus lines are disposed near the installation plane, the supporting structure therefor is simplified, assembly work therefor is facilitated, and earthquake resistance of the gas insulated switchgear device is improved.

BRIEF DESCRIPTION OF THE DRAWINGS

FIG. 1(a) is an explanatory view schematically illustrating a three dimensional arrangement of respective constitutional elements of a gas insulated switchgear device according to one embodiment of the present invention;

FIG. 1(b) is an explanatory view schematically illustrating a three dimensional arrangement of respective constitutional elements of a gas insulated switchgear device according to another embodiment of the present invention;

DESCRIPTION OF THE PREFERRED EMBODIMENTS

Figure 2:
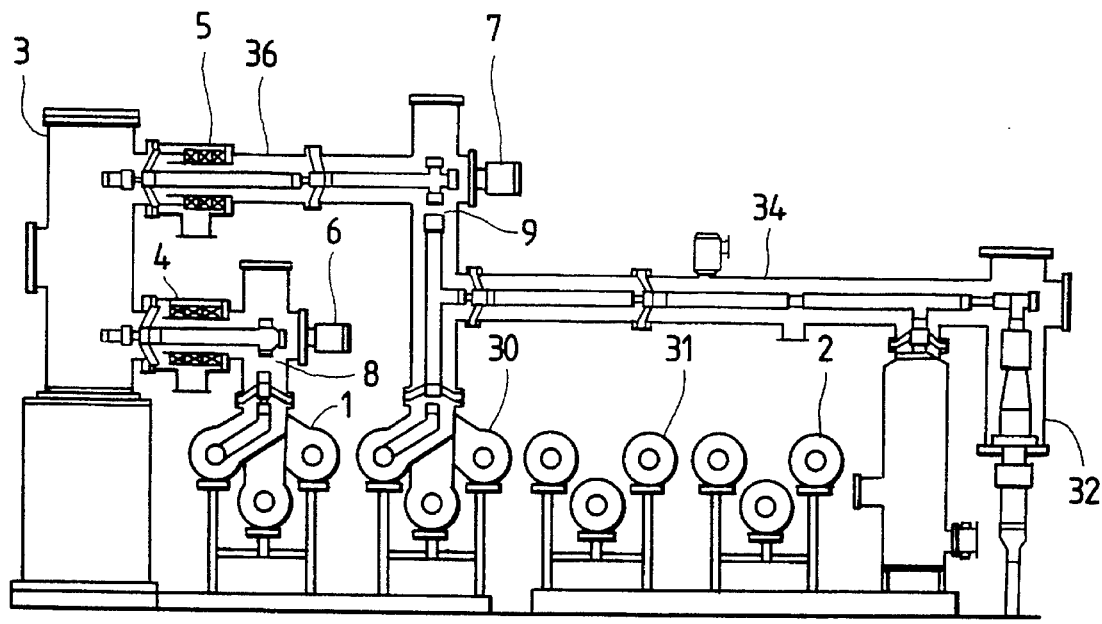
FIG. 2 is a front view illustrating one major portion of the one embodiment shown in FIG. 1(a)

Hereinbelow, embodiments according to the present invention are explained with reference to the drawings.

FIG. 1(a) is a circuit diagram of a gas insulated switchgear device to which the present invention is applied, and illustrates respective constitutional elements in the gas insulated switchgear device, so as to correspond to an actual arrangement thereof the detail of which will be explained later.

A pair of main bus lines 1 and 2 are arrangement substantially in parallel with a predetermined spacing distance, and auxiliary bus lines 30 and 31 are arranged in a space formed between the facing main bus lines 1 and 2 along two lines substantially in parallel with the main bus lines 1 and 2. Three circuit breakers 3, 10 and 17 are arranged along one side of these bus lines 1, 2, 30 and 31. The circuit breaker 3 is provided with current transformers 4 and 5, and grounding switches 6 and 7 at respective ends. One end of the circuit breaker 3 is connected to the main bus lines 1 via a disconnecting switch 8, and the other end thereof is connected to an insulated leading-out means 32 through which electrical power is received and supplied, and to the auxiliary bus line 30 via a disconnecting switch 9. The circuit breaker 10 is also provided with current transformers 11 and 12 and grounding switches 13 and 14 at respective ends. One end of the circuit breaker 10 is connected to the auxiliary bus lines 30 via a disconnecting switch 15, and the other end thereof to an insulated leading-out means through which electrical power is received and supplied, and to the auxiliary bus lines 31 via a disconnecting switch 16. Further, the circuit breaker 17 is provided with current transformers 18 and 19 and grounding switches 20 and 21 at respective ends, one end of the circuit breaker 17 being connected to the auxiliary bus lines 31 via a disconnecting switch 22, and the other end thereof to the main bus lines 2 via a disconnecting switch 23. Thus, the three circuit breakers 3, 10 and 17 are electrically connected in series between the main bus lines 1 and 2.

FIG. 1(b) will be explained later in connection with FIG. 6.

FIG. 2 is a front view of a major portion of the gas insulated switchgear device as illustrated in FIG. 1(a), especially a front view of the circuit breaker 3 and its associated constitutional elements as illustrated in FIG. 1(a).

The main bus lines 1 and 2 are respectively constituted in a form of phase isolated type, the main bus lines 1 being arranged in parallel at the left hand side in the drawing near the installation plane and the main bus lines 2 in parallel at the right hand side in the drawing near the installation plane with a predetermined spacing distance from the main bus lines 1. Further between these pair of main bus lines 1 and 2 the auxiliary bus lines 30 and 31 are arranged in parallel near the installation plane. The auxiliary bus lines 30 and 31 are also preferably constituted in a form of phase isolated type. Thus, the main bus lines 1 and 2 and the auxiliary bus lines 30 and 31 are arranged substantially in parallel over a horizontal plane near the installation plane. Three phase components of the circuit breaker 3 are disposed at one side of these bus lines 1, 2, 30 and 31, namely at the left hand side of the main bus lines 1 in the present illustrated embodiment, and along the axial direction of these bus lines 1, 2, 30 and 31. However, since the structures of the respective phase components are substantially the same, hereinbelow the structure of only one phase component of the circuit breaker 3 is explained.

The circuit breaker 3 and its associated components are arranged on a vertical plane crossing perpendicularly through the respective bus lines 1, 2, 30 and 31. The circuit breaker 3 is a vertical type circuit breaker, and a lower leading-out portion thereof among two leading-out portions formed in parallel at upper and lower positions thereof is connected to the disconnecting switch 8 at an upper portion of the main bus lines 1 via the current transformer 4. Further, the upper leading-out portion is connected to a connecting conductor 36 via current transformer 5, and the connecting conductor 36 extends over the main bus lines 1 to be connected to the disconnecting switch 9 at an upper portion of the auxiliary bus lines 30. A connecting conductor 34 is led out from at an intermediate position in the height direction of the disconnecting switch 9 and the auxiliary bus lines 30, is extended over the auxiliary bus lines 31 and the main bus lines 2 and is connected to the insulated leading-out means 32, which is represented by a cable head disposed at the other side of the respective bus lines 1, 2, 30 and 31.

Figure 3:
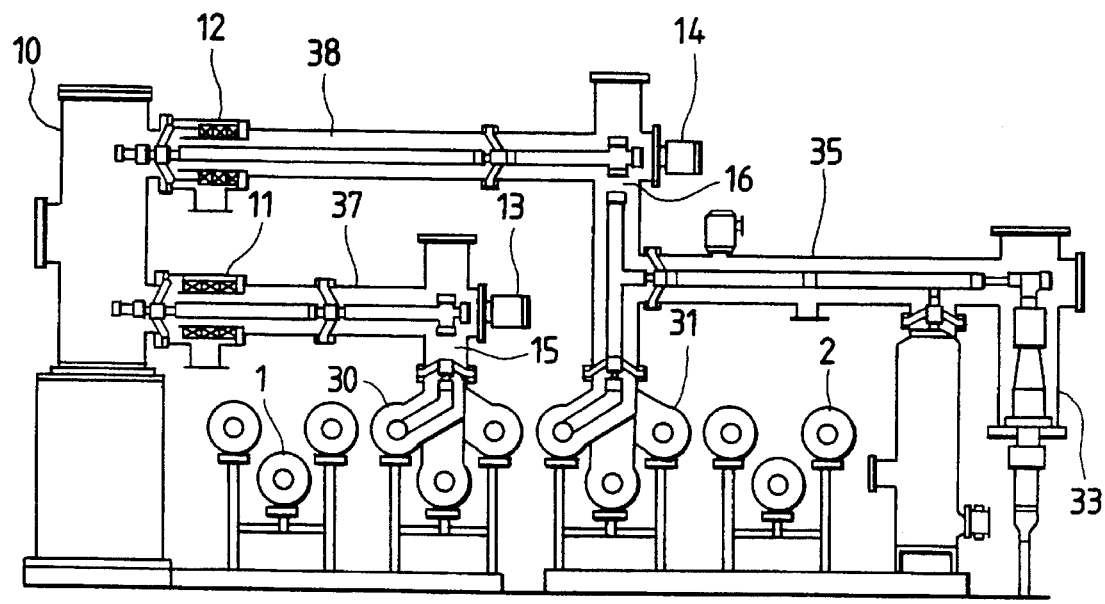
FIG. 3 is a front view illustrating another major portion of the one embodiment shown in FIG. 1(a)

FIG. 3 is a front view of another major portion of the gas insulated switchgear device as illustrated in FIG. 1(a), especially a front view of the circuit breaker and its associated constitutional elements as illustrated in FIG. 1(a).

Three phase components of the circuit breaker 10 are also disposed at one side of these bus lines 1, 2, 30 and 31, namely at the left hand side of the main bus lines 1 in the present illustrated embodiment, and along the axial direction of these bus lines 1, 2, 30 and 31. However, since the structures of the respective phase components are substantially the same, hereinbelow the structure of only one phase component of the circuit breaker is explained.

The circuit breaker 10 and its associated components are arranged on another vertical plane crossing perpendicularly through the respective bus lines 1, 2, 30 and 31. The circuit breaker 10 is a vertical type circuit breaker and a lower leading-out portion thereof among two leading-out portions formed in parallel at upper and lower positions thereof is connected to a connecting conductor 37 via the current transformer 11, and the connecting conductor 37 extends over the main bus lines 1 to be connected to the disconnecting switch 15 disposed above the auxiliary bus lines 30. Further, the upper leading-out portion is connected to a connecting conductor 38 via the current transformer 12, and the connecting conductor 38 is connected to the disconnecting switch 16 disposed at an upper portion of the auxiliary bus lines 31. A connecting conductor 35 is led out from an intermediate position in the height direction of the disconnecting switch 16 and the auxiliary bus lines 31, is extended over the main bus lines 2 and is connected to the insulated leading-out means 33, which is represented by a cable head disposed at the other side of the respective bus lines 1, 2, 30 and 31.

Figure 4:
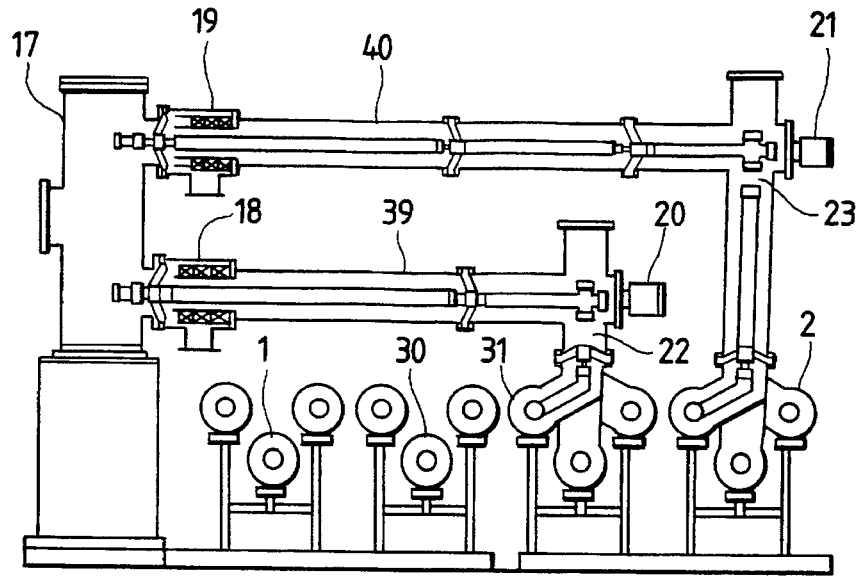
FIG. 4 is a front view illustrating still another major portion of the embodiment shown in FIG. 1(a)

FIG. 4 is a front view of still another major portion of the gas insulated switchgear device as illustrated in FIG. 1(a), especially a front view of the circuit breaker 17 and its associated constitutional elements as illustrated in FIG. 1(a).

Three phase components of the circuit breaker 17 are also disposed at one side of these bus lines 1, 2, 30 and 31, namely at the left hand side of the main bus lines 1 in the present illustrated embodiment, and along the axial direction of these bus lines 1, 2, 30 and 31. However, since the structures of the respective phase components are substantially the same, hereinbelow the structure of only one phase component of the circuit breaker 17 is explained.

The circuit breaker 17 and its associated components are arranged on still another vertical plane crossing perpendicularly through the respective bus lines 1, 2, 30 and 31. The circuit breaker 17 is also a vertical type circuit breaker and a lower leading-out portion thereof among two leading-out portions formed in parallel at upper and lower positions thereof is connected to a connecting conductor 39 via the current transformer 18. The connecting conductor 39 extends over the main bus lines 1 and the auxiliary bus lines 30 and is connected to the disconnecting switch 22 disposed above the auxiliary bus lines 31. Further, the upper leading-out portion is connected to a connecting conductor 40 via the current transformer 19, and the connecting conductor 40 extends over the main bus lines 1 and the auxiliary bus lines 30 and 31 to be connected to the disconnecting switch 23 at an upper portion of the main bus lines 2.

Thus the three circuit breakers 3, 10 and 17 are connected in series between the main bus lines 1 and 2, and the insulated leading-out means 32 and 33 are led out from between the respective circuit breakers 3 and 10, and 10 and 17.

In the arrangement structure of the respective circuit breakers 3, 10 and 17 and their associated components as explained above, the heavy main bus lines 1 and 2 and the heavy auxiliary bus lines 30 and 31 are arranged at a lower position near the installation plane, so that the assembly work of the respective bus lines 1, 2, 30 and 31 is facilitated and the earthquake resistance of the gas insulated switchgear device is improved. Further, since the respective circuit breakers and their associated components are arranged on the three separate substantially vertical planes, each crossing perpendicularly through the axial lines of the main bus lines 1 and 2 and the auxiliary bus lines 30 and 31, the respective circuit breakers 3, 10 and 17 and the circuit breaker units for the respective phases in respective circuit breakers can be arranged close to each other along the axial direction of the main bus lines 1 and 2 and the auxiliary bus lines 30 and 31, and the area of the installation plane of the gas insulated switchgear device is reduced accordingly. Moreover, since the respective circuit breakers 3, 10 and 17 are arranged along one side of the respective bus lines 1, 2, 30 and 31, a space for inspection work is formed at the other side of the circuit breakers remote from the bus lines, which facilitates the maintenance and inspection work of the circuit breakers.

Figure 5:
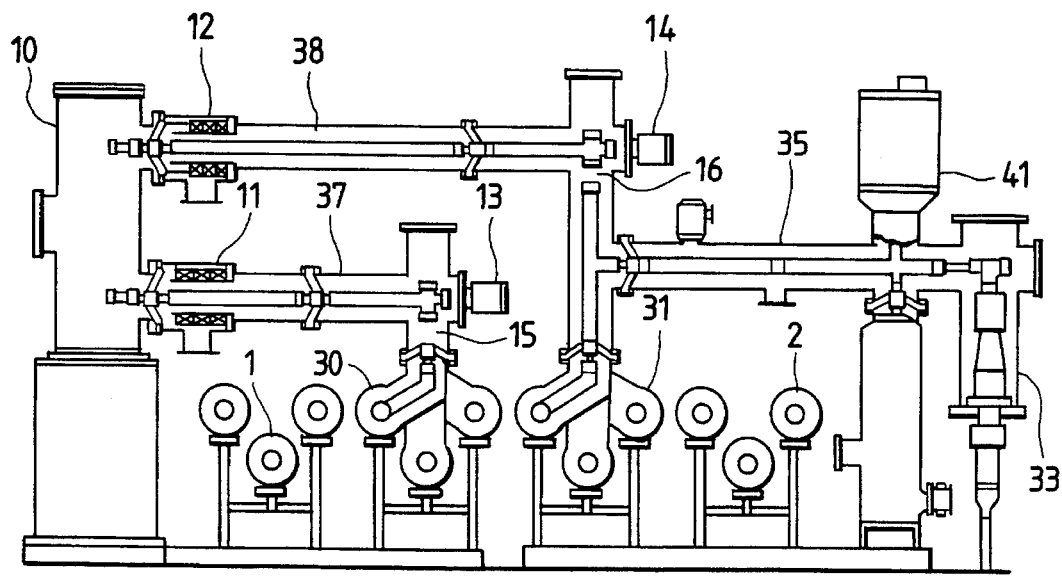
FIG. 5 is a front view of a major portion of a modified embodiment of the gas insulated switchgear device shown in FIG. 3.

Further, even when it is required to provide a line side transformer 41 in a gas insulated switchgear device as illustrated in FIG. 5, the earthquake resistance of the gas insulated switchgear device is improved according to the present invention. Namely, FIG. 5 illustrates a front view of an embodiment wherein the line side transformer 41 is provided for the circuit breakers 10 and its associated elements in the gas insulated switchgear device as illustrated in FIG. 3.

In FIG. 5, the same or equivalent elements as those in FIG. 3 are designated by the same reference numerals, and their explanation is omitted.

In the same manner as in the previous embodiment shown in FIG. 3, the disconnecting switch 16 is disposed near the crossing point of an axial line of the substantially horizontal upper leading-out portion of the circuit breaker 10, namely the axial line of the connecting conductor 38, and a substantially vertical line passing through the auxiliary bus lines 31. Further, the substantially horizontal connecting conductor 35 is led out from a substantially intermediate portion of the disconnecting switch 16 and the auxiliary bus lines 31 in their height direction. Accordingly, even when the line side transformer 41 is connected to the connecting conductor 35 at its upper portion, the height of the line side transformer 41 is limited so that the earthquake resistance of the gas insulated switchgear device is improved.

Figure 6:
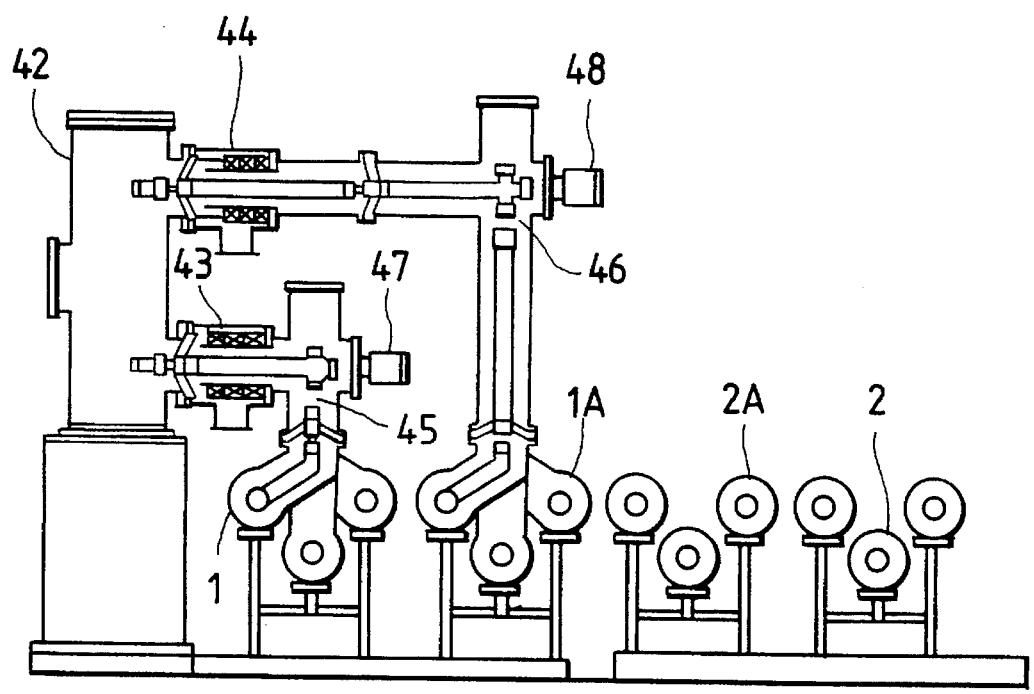
FIG. 6 is a front view illustrating one major portion of the embodiment shown in FIG. 1(b).

FIG. 1(*b*) illustrates a three dimensional arrangement diagram of respective constituent elements of a gas insulated switchgear device for sectioning bus lines according to another embodiment of the present invention, and FIG. 6 is a front view thereof.

The gas insulated switchgear device for sectioning bus lines is provided midway of the main bus lines 1 and 2, and is connected thereto in such a manner that the main bus lines 1 and 2 can be electrically separated in their axial direction through the gas insulated switchgear device as illustrated in FIG. 1(*b*). For example, at the respective ends of a circuit breaker 42 which constitutes a part of the gas insulated switchgear device for sectioning bus lines, in particular for sectioning the main bus lines 1, current transformers 43 and 44 are provided, and the respective ends thereof are connected to main bus lines 1 and 1A via grounding switches 47 and 48 and disconnecting switches 45 and 46. Since a main bus lines 1 and 2 are arranged with the predetermined spacing distance, permitting disposition of the auxiliary bus lines 30 and 31 as explained in connection with the previous embodiment, the end portion of the main bus lines 1A adjacent to the main bus lines 1 are bent so as to locate along the disposition line of the auxiliary bus lines 30 and to form an overlapping portion of the main bus lines 1 and 1A at their facing ends. The gas insulated switchgear device for sectioning bus lines as illustrated in FIG. 6 is thereby constituted by making use of the overlapping portion. A gas insulated switchgear device for sectioning between the main bus lines 2 and 2A can be constituted in the same manner as that illustrated in FIG. 6.

In the above embodiments, the auxiliary bus lines 30 and 31 are disposed between the main bus lines 1 and 2. However, even if the arrangement position of the main bus lines 1 and 2 and the auxiliary bus lines 30 and 31 are interchanged, the same advantages are obtained.

Further, in the above embodiments the bus lines 1, 2, 30 and 31 are a phase isolated type; however these bus lines can be a three phase collective type.

Still further, in the above embodiments the bus lines 1, 2, 30 and 31 are disposed above the installation plane; however these bus lines can be disposed to be directly supported by the installation plane.

According to the present invention explained hitherto, a pair of main bus lines and a pair of auxiliary bus lines are arranged in parallel near the installation plane and three circuit breakers are arranged at one side of these bus lines along their axial direction, and thereby a space for inspection work is formed at one side of the circuit breakers remote from the bus lines, which facilitates an inspection and maintenance work thereof. Further, since these bus lines are disposed at a lower position, the earthquake resistance of the gas insulated switchgear device is improved.

We claim:

1. A gas insulated switchgear device comprising:

first and second main bus lines arranged in parallel;

first and second auxiliary bus lines arranged in parallel;

a first circuit breaker electrically connecting the first main bus line and the first auxiliary bus line;

a second circuit breaker electrically connecting the first auxiliary bus line and the second auxiliary bus line;

a third circuit breaker electrically connecting the second auxiliary bus line and the second main bus line, such that the first, second, and third circuit breakers are electrically connected in series between the first and second main bus lines via the first and second auxiliary bus lines;

first and second disconnecting switches switchably connecting the first circuit breaker at first and second ends thereof, respectively, to the first main bus line and to the first auxiliary bus line, respectively;

third and fourth disconnecting switches switchably connecting the second circuit breaker at first and second ends thereof, respectively, to the first auxiliary bus line and to the second auxiliary bus line, respectively;

fifth and sixth disconnecting switches switchably connecting the third circuit breaker at first and second ends thereof, respectively, to the second auxiliary bus line and to the second main bus line, respectively;

a first insulated leading-out means electrically connected to a first junction point between the second and third disconnecting switches, for receiving and supplying electrical power to the first junction point; and a second insulated leading-out means electrically connected to a second junction point between the fourth and fifth disconnecting switches for receiving and supplying electrical power to the second junction point;

wherein said first and second main bus lines and said first and second auxiliary bus lines are arranged in parallel to each other over a substantially horizontal plane, and said first, second, and third circuit breakers are vertical type circuit breakers disposed at one side of said first and second main bus lines and said first and second auxiliary bus lines along a common axial direction thereof.

2. A gas insulated switchgear device according to claim 1, wherein each of said circuit breakers includes a pair of upper and lower horizontally extending leading-out portions, the lower leading-out portion of the first circuit breaker is switchably connected to said first main bus line via the first disconnecting switch the lower leading-out portion of the second circuit breaker is switchably connected to said first auxiliary bus line via the third disconnecting switch, the lower leading-out portion of the third circuit breaker is switchably connected to the second auxiliary bus line via the fifth disconnecting switch, the upper leading-out portion of the first circuit breaker is switchably connected to the first auxiliary bus line via the second disconnecting which, the upper leading-out portion of the second circuit breaker is switchably connected to the second auxiliary bus line via the fourth disconnecting switch, and the upper leading-out portion of the third circuit breaker is switchably connected the second main bus line via the sixth disconnecting switch;

wherein the bus line to which each upper leading-out portion is connected is remote with respect to the circuit breaker of the respective upper leading-out portion from the bus line to which the lower leading-out portion of the respective circuit breakers is connected.

3. A gas insulated switchgear device according to claim 2, wherein each of the second, fourth, and sixth disconnecting switches is placed near the crossing point of a substantially horizontal axial line of the upper leading-out portion respectively connected thereto and a vertical line passing through the respective bus line to which each upper leading-out portion is connected via the corresponding disconnecting switch, and each said insulated leading-out means is connected to a connecting conductor which is led out from an intermediate position between the corresponding disconnecting switch and the bus line in the vertical direction.

4. A gas insulated switchgear device according to claim 1, wherein said first, second, and third circuit breakers and their corresponding disconnecting switches are designed to be located respectively on three separate vertical planes which are substantially perpendicular to the axial direction of said main bus lines and said auxiliary bus lines, and said first and second insulated leading-out means are respectively located on any two of the three separate vertical planes.

5. A gas insulated switchgear device according to claim 1, wherein said first and second main bus lines are arranged in parallel with a predetermined spacing distance and said first and second auxiliary bus lines are arranged between said first and second main bus lines.

6. A gas insulated switchgear device comprising:

a pair of first main bus lines arranged in parallel;

a pair of second main bus lines arranged in parallel and respectively running from said pair of first main bus lines along extending lines thereof, wherein respective ends of said pair of second main bus lines are adjacent to respective ends of said pair of first main bus lines and are bent inwardly so as to run parallel with said pair of first bus lines for a predetermined distance;

first and second circuit breakers each including at first and second ends thereof respective disconnecting switches, said first circuit breaker being switchably connected between one of said pair of first main bus lines and one of said pair of second main bus lines, wherein said pair of first main bus lines and said pair of second main bus lines are arranged over a substantially horizontal plane, and the first and second circuit breakers are vertical type circuit breakers and are disposed at one side of said pair of first main bus lines and said pair of second main bus lines along an axial direction thereof.

7. A gas insulated switchgear device according to claim 6, wherein each of said circuit breakers includes a pair of upper and lower horizontally extending leading-out portions, the lower leading-out portion of the first circuit breaker is switchably connected to one of said pair of first main bus lines via the disconnecting switch at said first end thereof, the lower leading-out portion of the second circuit breaker is switchably connected to one of said pair of second main bus lines via the disconnecting switch at said first end thereof, the upper leading-out portion Of the first circuit breaker is switchably connected to the other of said pair of second main bus lines via the disconnecting switch at said second end thereof, and the upper leading-out portion of the second circuit breaker is switchably connected to the other of said first pair of main bus lines via the disconnecting switch at said second end thereof;

wherein the bus line to which each upper leading-out portion is connected is remote with respect to the circuit breaker of the respective upper leading-out portion from the bus line to which the lower leading-out portion of the respective circuit breaker is connected.

8. A gas insulated switchgear device according to claim 6, wherein the first and second circuit breakers and their corresponding disconnecting switches are designed to be located respectively on two separate vertical planes which are substantially perpendicular to the axial direction of said first main bus lines and said second main bus lines.

* * * * *